H. P. KRAFT.
INFLATING COUPLING.
APPLICATION FILED JUNE 25, 1917.
1,362,804. Patented Dec. 21, 1920.
Fig. 2. Fig. 1.
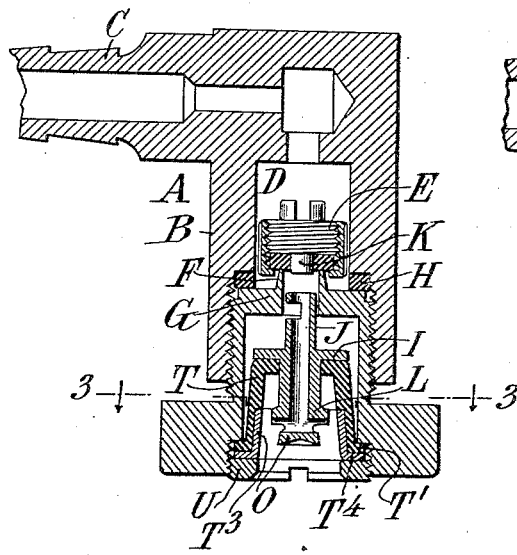
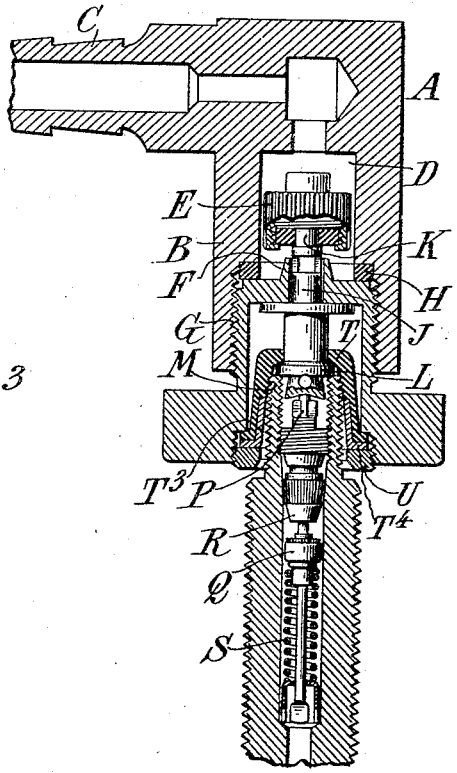
Fig. 3.
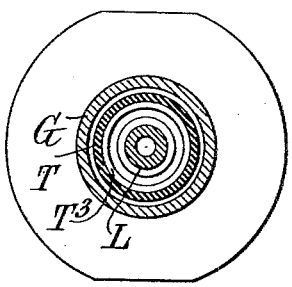
WITNESSES:
René Bruine
T. B. Wallace
INVENTOR
Henry P. Kraft
By Attorneys,
Fraser, Fult & Myers

UNITED STATES PATENT OFFICE.

HENRY P. KRAFT, OF RIDGEWOOD, NEW JERSEY.

INFLATING-COUPLING.

1,362,804. Specification of Letters Patent. Patented Dec. 21, 1920.

Application filed June 25, 1917. Serial No. 176,814.

*To all whom it may concern:*

Be it known that I, HENRY P. KRAFT, a citizen of the United States of America, residing in Ridgewood, in the county of Bergen and State of New Jersey, have invented certain new and useful Improvements in Inflating-Couplings, of which the following is a specification.

This invention relates to inflating couplings and aims to provide certain improvements therein.

The invention is particularly designed as an improvement on the inflating coupling shown in the application of Schweinert and Kraft, Serial No. 155,780. In such application a bell-shaped or cone-shaped washer is provided which is adapted to fit over the nipple of the tire valve to make a tight joint between the coupling and the valve; the construction of this washer is, by the present invention, greatly improved and rendered more durable.

Referring to the drawings which illustrate one embodiment of the invention,—

Figure 1 is a diametrical section of my improved inflating coupling, shown as applied to a tire valve.

Fig. 2 is a similar section of the inflating coupling with the valve removed.

Fig. 3 is a section on the line 3—3 in Fig. 2.

Referring to the drawings, let A indicate the coupling as a whole, which is shown as comprising a cylindrical casing B and an angled connection C adapted to be connected to the pipe-line supplying air under pressure. The casing B is formed with a valve chamber D within which works a check-valve E which is adapted to co-act with a seat F formed upon a seat member G. The seat member preferably screws into the cylinder, a tight joint between the two being formed by a packing H. The valve E is normally held against the seat F by pressure within the pipe-line so that no air can escape. To open the valve when the coupling is applied to a tire valve, a valve-opener I is provided. The latter has a valve-opening element J extending up through the seat F and contacting with an abutment K whereby the valve is lifted. The valve-opener is formed with a shoulder L which is adapted to engage the valve shoulder M, as shown in Fig. 1, so that by pressing down on the coupling, the valve-opener lifts the valve E. Below the shoulder L is arranged an abutment O which is of sufficiently small diameter to enter the valve nipple and which is adapted to engage the tire valve pin P, with the result that the tire valve check Q is forced from its seat R, thus opening the tire valve to the incoming passage of air. These features are described in the aforesaid application and form a part of the present invention.

The present invention particularly relates to the bell or cone-shaped washer T which is constructed of rubber and which is held in a seat-member by a flange T' which is clamped against the seat member by a screwthreaded collar U so as to make a tight joint between the edges of the washer T and the seat-member.

According to the present invention I provide the washer T with a stiffening collar $T^3$ which is preferably placed on the inner side of the washer T and extends part way up the same. The diameter of the collar is such that it easily admits the valve nipple, and beyond the collar the rubber of the washer T admits the nipple without too tight a fit. Preferably the collar $T^3$ is formed in one piece with a metal washer $T^4$, which latter serves to stiffen the flange T' and also constitutes an anti-friction member by means of which the screwthreaded collar U may force the washer to its seat without distorting the flange T'.

I have found by the above invention that a tight joint can be made between the valve nipple and the coupling with very little pressure and that this joint may be made a large number of times without destroying or impairing the utility of the washer.

While I have shown and described one form of the invention, it will be understood that I do not wish to be limited thereto, since various changes may be made therein without departing from the spirit of the invention. While I have illustrated the invention in connection with an automatic inflating coupling, it will be understood that it is applicable to any other construction in which it is desired to make a tight joint with a valve nipple or analogous part.

What I claim is:—

1. In a coupling having a casing adapted to receive within it an externally screwthreaded tire valve nipple or the like, and forming a chamber receiving air pressure when coupled, a cup-shaped packing adapted to make a close joint with the end portion of such nipple, projecting into such chamber and receiving when coupled external air pressure tending to contract it on said nipple, and a stiffening shell for said packing adapted to prevent the contraction of the packing against the nipple except at its end portion, whereby the abrasion of the packing by the external threads on the nipple is largely avoided.

2. In a coupling having an internal check-valve, and a valve-opening member extending thence to the coupling opening, said coupling having a chamber adapted to receive within it an externally screw-threaded tire valve nipple or the like, a cup-shaped packing projecting into said chamber adapted to make a close joint with the end portion of such nipple, and receiving when coupled external air pressure within said chamber and a stiffening shell for said packing adapted to prevent the contraction of the packing against the nipple except at its end portion.

3. In a coupling, adapted to receive within it an externally screw-threaded tire valve nipple or the like, a cup-shaped packing adapted to make a close joint with the end portion of such nipple, and a stiffening shell within said packing where it would engage a threaded portion of such nipple, adapted to receive such threaded portion to prevent the contraction of the packing against the nipple except at its end portion, whereby the abrasion of the packing by the threaded portion is largely avoided.

4. In a coupling having an internal check-valve, and a valve-opening member extending thence to the coupling opening, said coupling adapted to receive within it an externally screw-threaded tire valve nipple or the like, a cup-shaped packing adapted to make a close joint with the end portion of such nipple, the coupling having a chamber around said packing to which compressed air is admitted when said valve is opened, whereby to press the packing against such nipple, and a stiffening shell within the packing where it would engage a threaded portion of such nipple, adapted to receive such threaded portion to prevent the contraction of the packing against the nipple except at its end portion.

In witness whereof, I have hereunto signed my name.

HENRY P. KRAFT.